United States Patent
Fujikawa

[11] Patent Number: 6,002,463
[45] Date of Patent: Dec. 14, 1999

[54] LIQUID CRYSTAL DEVICE HAVING A LIGHT BLOCKING LAYER PROVIDED OVER AN ALIGNMENT LAYER, METHOD FOR MAKING THE SAME

[75] Inventor: Shinsuke Fujikawa, Suwa, Japan

[73] Assignee: Seiko Epson Corporation, Shinjuku-ken, Japan

[21] Appl. No.: 08/894,948
[22] PCT Filed: Jan. 30, 1997
[86] PCT No.: PCT/JP97/00211
§ 371 Date: Sep. 4, 1997
§ 102(e) Date: Sep. 4, 1997
[87] PCT Pub. No.: WO97/28483
PCT Pub. Date: Jul. 8, 1997

[30] Foreign Application Priority Data

Jan. 30, 1996 [JP] Japan ................................ 8-013538

[51] Int. Cl.$^6$ .................... G02F 1/1333; G02F 1/1339
[52] U.S. Cl. ............................................ 349/110; 349/156
[58] Field of Search .................................. 349/110, 156

[56] References Cited

U.S. PATENT DOCUMENTS

| | | | |
|---|---|---|---|
| 5,585,951 | 12/1996 | Noda et al. .................................. | 349/122 |
| 5,691,788 | 11/1997 | Kim .............................................. | 349/110 |
| 5,789,761 | 8/1998 | Ihara et al. ................................... | 349/110 |
| 5,818,558 | 10/1998 | Ogishima ..................................... | 349/156 |
| 5,854,663 | 12/1998 | Oh et al. ...................................... | 349/110 |

FOREIGN PATENT DOCUMENTS 5-80320  4/1993  Japan .

OTHER PUBLICATIONS

"Series Optronics Searchlight No. 12", OPTRONICS Jul. 1995, No. 7, p. 218–219.

*Primary Examiner*—William L. Sikes
*Assistant Examiner*—Kari M. Horney
*Attorney, Agent, or Firm*—Oliff & Berridge, PLC

[57] ABSTRACT

A substrate for liquid crystals has a black matrix provided over an alignment layer. The alignment layer is formed on a thin film transistor and a transparent pixel electrode. A black resinous material not containing carbon can be used as the black matrix. The black matrix is formed after the alignment layer is subjected to alignment treatment. Therefore, alignment defects of the alignment layer due to the thickness of the black matrix rarely occur. If alignment defects do occur, light transmission will not be degraded because the alignment defects sections are covered with the black matrix.

11 Claims, 13 Drawing Sheets

FIG. IA
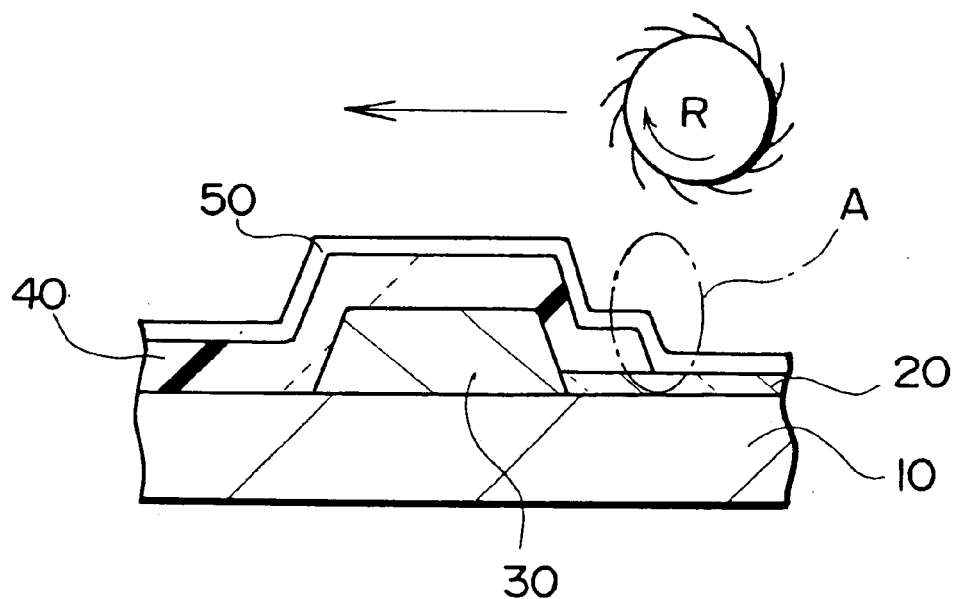
FIG. IB
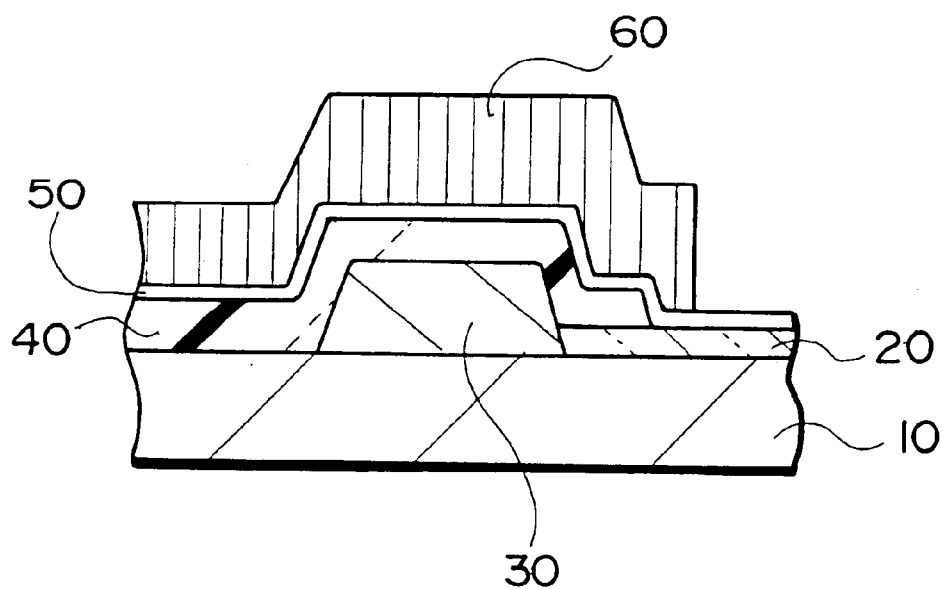

LIQUID CRYSTAL DEVICE HAVING A LIGHT BLOCKING LAYER PROVIDED OVER AN ALIGNMENT LAYER, METHOD FOR MAKING THE SAME

DESCRIPTION

1. Field of the Invention

The present invention relates to a substrate for liquid crystal devices, a method for making the same, a liquid crystal device and an electronic device.

2. Description of Related Art

An active matrix type color liquid crystal display comprises an active matrix substrate, an opposite substrate (a color filter substrate) and a liquid crystal interposed between both substrates.

Since a liquid crystal display device represents given images by means of control of light transmitting the liquid crystal, the light transmission must be strictly controlled. Thus, a light blocking layer, known as a black matrix, is generally provided on the opposite substrate (color filter substrate) in order to prevent transmission and influx of undesired light.

In more detail, the black matrix prevents a decrease in display contrast due to back light transmission between a transparent pixel electrode of indium tin oxide (ITO) and its circumferential wiring and the like, and a decrease in display quality due to leakage current excited by incident light at the channel region of a thin film transistor (TFT). Chromium (Cr) is a material generally used for black matrices.

However, since chromium (Cr) has a high light reflectance in spite of excellent light blocking characteristics, reflected light may adversely affect the display.

Further, when a black matrix is provided at the opposite substrate (color filter substrate) side, two substrates formed in different steps are connected to each other. A layout clearance of, for example, approximately 10 mm, thus, must be considered in design of active matrix substrates depending on alignment accuracy. Such a clearance is one of factors inhibiting a higher aperture ratio.

For the purpose of resolving such a problem, black matrices, in which black resinous materials having low reflectance are used instead of conventional black matrices of thin metal film having high reflectance represented by chromium (Cr), have been studied.

Black matrices using both thin metal films and black resinous materials have also been investigated in order to secure excellent alignment control and light blocking characteristics, as well as low reflectance ((1) Japanese Unexamined Patent Publication No. 5-80320, and (2) "Series Optronics Searchlight No. 12", OPTRONICS July 1995, No. 7, p. 218–219).

However, according to the present inventors' investigation, it has been found that black matrices using black resinous materials also have problems.

In detail, since black resinous materials are inferior to thin metal films in light blocking characteristics in spite of low reflectance, the film thickness of the black matrix should be increased for satisfactory light blocking characteristics. The increased film thickness of the black matrix causes a large bump between a position in which a black matrix is present and a position in which a black matrix is not present, and alignment control at the bump section by means of alignment treatment (rubbing treatment) is difficult.

The present inventors have also investigated a thinner film black matrix using both a metal and a black resinous material, and found that it is not practically useful since production is complicated due to increased production steps and cost increases, and thus it is desirable to form the black matrix using a single material.

On the other hand, there is a proposal in which a black matrix is provided at the active matrix substrate side with no layout clearance from the viewpoint of problems of the black matrix provided at the opposite substrate (color filter substrate) side (International Patent Application No. PCT/JP92/01562, International Laid-Open No. WO93/11455).

The present inventors have investigated a black matrix formed from a black resinous material and provided at the active matrix substrate side. As a result, a new problem of conductivity of the black matrix has been found in addition to the above-mentioned increased film thickness.

In detail, when a black matrix is formed at the active matrix substrate side, in which thin film transistors (TFT) are formed, and when the black matrix is conductive, a black matrix will short-circuit the TFTs on both sides. Therefore, the black matrix is preferably nonconductive when being provided at the active matrix substrate side. Known black resinous materials are roughly divided into two types, i.e., carbon-dispersed resins and pigment-dispersed resins.

Carbon-dispersed resins have an advantage of relatively high light blocking characteristics and a disadvantage of conductivity due to the dispersed carbon. In contrast, pigment-dispersed resins must have larger thicknesses for high light blocking characteristics in spite of being relatively non-conductive. As described above, an increase in the black matrix film thickness causes an increased bump around the black matrix, resulting in alignment defects of the alignment layer and deterioration of display quality.

Although it is preferable that a black matrix which comprises a black resinous material with low reflectance has high light blocking characteristics, is nonconductive, and does not cause alignment defects of the alignment layer be provided at the active matrix substrate side, no conventional technique satisfies all the requirements.

SUMMARY OF THE INVENTION

Accordingly, it is an object of the present invention to provide a substrate for liquid crystal devices having a high quality not conventionally achieved.

A substrate for liquid crystal devices has an alignment layer, on which alignment treatment was performed, provided on the substrate, and a light blocking layer provided on the alignment layer so as to cover a part of the alignment layer.

By means of such a structure, the light blocking layer is formed after alignment treatment is performed on the alignment layer, and no bump due to the thickness of the light blocking layer occurs in the alignment treatment.

Further, the thickness of the light blocking layer can be appropriately determined regardless of the conditions of alignment treatment. Thus, both satisfactory alignment treatment and satisfactory light blocking characteristics can be achieved.

If alignment defects occur in parts of the alignment layer, the light blocking layer can cover these parts, and thus such alignment defects do not adversely affect image display.

Another embodiment of the substrate for liquid crystal devices in accordance with the present invention comprises a scanning line and a data line provided on the substrate, a switch element electrically connected to the scanning line and the data line, a pixel electrode electrically connected to the switch element, an insulating film formed so as to cover the switch element, an alignment layer after alignment treatment provided on the insulating film and the pixel electrode, and a light blocking layer provided on the alignment layer so as to cover parts of the alignment layer.

Since the light blocking layer is formed on the substrate (active matrix substrate) on which the switch element has been formed, no additional space is required for alignment of the light blocking layer and the pixel electrode, and thus a high aperture can be achieved. Satisfactory alignment treatment and satisfactory light blocking characteristics are also secured.

In another embodiment of the substrate for liquid crystal displays in accordance with the present invention, the light blocking layer comprises a resinous material. Since the resinous material has a low reflectance, adverse effects of the reflected light on displayed images can be reduced.

In a further embodiment of the substrate for liquid crystal displays in accordance with the present invention, the light blocking layer comprises a photosensitive resinous material. Since the photosensitive resin is capable of processing by direct exposure using a photolithographic technology, the number of the forming steps of the light blocking layer can be decreased.

In still another embodiment of the substrate for liquid crystal displays in accordance with the present invention, the light blocking layer is opened on the pixel electrode, and the outline of the aperture section of the light blocking layer is located at the interior of the outline of the pixel electrode.

A bump occurs around the pixel electrode and alignment defects of the alignment layer will readily occur at the bump section. Since the outline of the aperture section of the light blocking layer is located at the interior of the outline of the pixel electrode, the outline of the pixel electrode can be perfectly covered with the light blocking layer. Further, if alignment defects occur, the alignment defect section is covered with the light blocking layer and thus the displayed image is not adversely affected.

In a still further embodiment of the substrate for liquid crystal displays in accordance with the present invention, the outline of the aperture section of the light blocking layer is located at the interior of the bump section formed near the junction between the pixel electrode and the switch element. Since the bump further increases due to the thickness of the wiring for connecting the switch element and the pixel electrode, alignment defects will readily occur at this section. Thus, the bump section is intended to be perfectly covered with the light blocking layer.

In another embodiment of the substrate for liquid crystal displays in accordance with the present invention, the alignment layer formed on the active matrix substrate is also used as an insulating film to secure insulation between the switch element and the light blocking layer. High insulating characteristics provided by a polyimide alignment layer and the like are used. The bump is decreased because no insulating film is provided, and thus the alignment layer can be readily aligned.

In a further embodiment of the substrate for liquid crystal displays in accordance with the present invention, an insulating gate type thin film transistor is used as the switch element, the source region and the drain region of the thin film transistor are connected to a first electrode comprising a conductive material for forming the data line and a second electrode comprising a material for forming the pixel electrode, and the first electrode and the second electrode belong to the same level. A thin film transistor having such a structure is effective for decreasing the bumps.

A method for making a substrate for liquid crystal devices in accordance with the present invention comprises a step for forming an alignment layer on the substrate, a step for performing alignment treatment of the alignment layer, and a step for forming a light blocking layer on the alignment layer after alignment treatment.

In the alignment layer after alignment treatment, molecules are oriented along a specified direction, and the molecular orientation is maintained after the light blocking layer comprising an organic resin is formed on and removed from the surface of the alignment layer. Therefore, the above-mentioned method enables compatibility of alignment characteristics of the alignment layer and satisfactory light blocking characteristics of the light blocking layer.

In an embodiment of the method for making a substrate for liquid crystal devices in accordance with the present invention, a photosensitive resinous film is used as the alignment layer, exposed and developed to form a light blocking layer. Processing by direct exposition can reduce the number of manufacturing steps.

In a liquid crystal device in accordance with the present invention, a liquid crystal is interposed between a pair of substrates, at least one electrode among them is provided with a light blocking layer, and the light blocking layer is provided on the alignment layer. The liquid crystal device is of high quality.

In an embodiment of the liquid crystal device in accordance with the present invention, the light blocking layer is formed on both substrates. The light blocking layer can not only block the back light, but can also prevent leakage of the reflected light from the light blocking layer.

An electronic device in accordance with the present invention is loaded with a liquid crystal device in accordance with the present invention. The electronic device can display or form high quality images.

BRIEF DESCRIPTION OF THE DRAWINGS

FIG. 1A is a cross-sectional view of a main section of a substrate for liquid crystal devices in accordance with the present invention, in which alignment treatment is performed on an alignment layer;

FIG. 1B is a cross-sectional view of a main section in which a black matrix is formed on the alignment film after the alignment treatment;

Figure 2A:
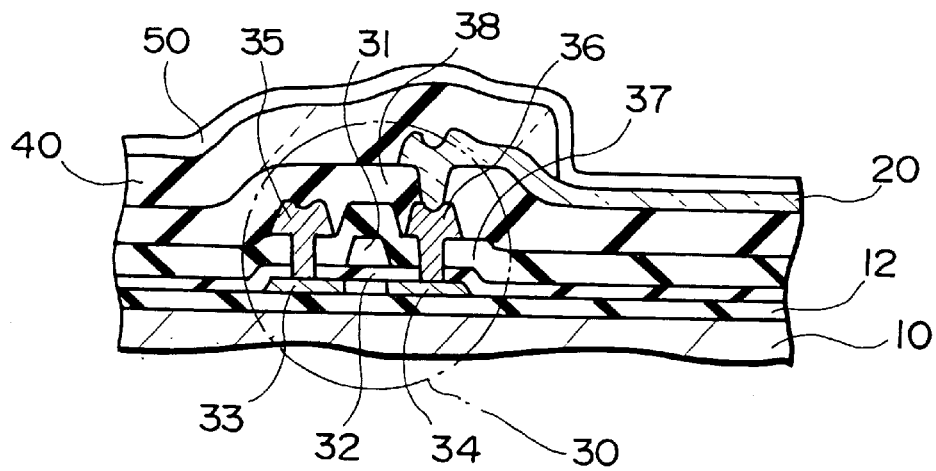
FIG. 2A is a cross-sectional view of an embodiment of a main section of a substrate for liquid crystal devices in accordance with the present invention.

DETAILED DESCRIPTION OF THE PREFERRED EMBODIMENTS (1) First Embodiment

Embodiments of a substrate for liquid crystal devices in accordance with the present invention will now be described.

(Description of a structure of a device shown in FIGS. 1A and 1B)

FIGS. 1A and 1B are cross-sectional views of a main section of an active matrix substrate in accordance with the present invention. FIG. 1A shows a state in which alignment treatment is performed on an alignment layer 50, and FIG. 1B shows a state in which a light blocking layer 60 (hereinafter referred to as black matrix) is formed on the alignment layer 50 after the alignment treatment.

In FIGS. 1A and 1B, reference numeral 10 represents a transparent substrate such as glass, reference numeral 20 represents a transparent pixel electrode (ITO), reference numeral 30 represents a thin film transistor (TFT), reference numeral 40 represents an insulating film such as a $SiO_2$ film, reference numeral 50 represents an alignment layer, and reference numeral 60 represents a black matrix.

(Description of Symbolized Device Structure)

In FIGS. 1A and 1B, the thin film transistor 30 and the transparent pixel electrode (ITO) 20 are symbolically expressed to simplify the drawings. Since the symbolized drawings are used hereinafter, the symbolized device structure will be described using FIGS. 2A through 2C.

Figure 2B:
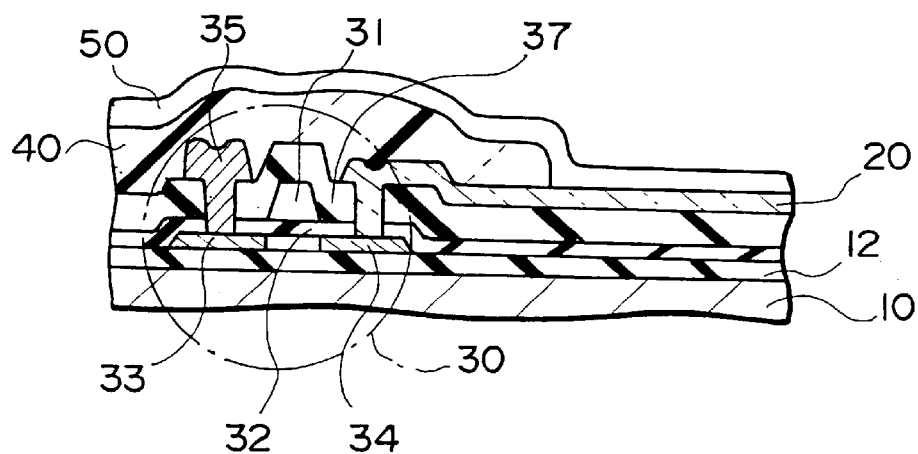
FIG. 2B is a cross-sectional view of another embodiment of the main section.
Figure 2C:
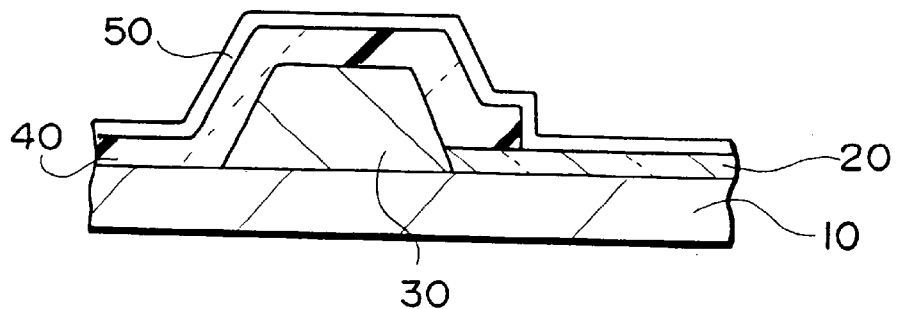
FIG. 2C is a symbolized cross-sectional view of the substrates for liquid crystal devices shown in FIGS. 2A and 2B.

Concrete device structures exemplified in FIGS. 2A and 2B are symbolized as shown in FIG. 2C. Thus, the symbolized structure in FIG. 2C includes both structures exemplified in FIGS. 2A and 2B.

In FIG. 2A, the TFT 30 expressed by a semi-broken line circle comprises source/drain regions (33 and 34) composed of polysilicon formed on the insulating layer 12, a gate insulating film 32, a gate electrode 31 composed of tantalum, electrodes 35 and 36 composed of aluminum (Al), an interlevel insulating film 38, and the transparent electrode layer (ITO layer) 20 composed of ITO (indium tin oxide) connected to the aluminum electrode 36.

In FIG. 2B, the TFT 30 expressed by a semi-broken line circle also has a similar structure, but differs in that the transparent electrode layer (ITO layer) 20 composed of ITO is directly connected to the source/drain region 34. In FIG. 2A, the aluminum layer and the ITO layer belong to different levels, whereas in FIG. 2B, the aluminum layer and the ITO layer belong to the same level.

In FIG. 2C, the TFTs 30 shown in FIGS. 2A and 2B are symbolized by a trapezoid, the insulating film 12 provided between the ITO layer 20 and the substrate 10 is omitted such that the ITO layer 20 is directly provided on the substrate 10, and the ITO layer 20 is connected to the bottom section of the symbolized TFT 30.

The notation of the symbolized drawings was described above.

(Features of a Device Shown in FIGS. 1A and 1B)

As clearly shown in FIG. 1B, an active matrix substrate in accordance with the present invention adopts a novel structure in which a black matrix 60 is provided on an alignment layer 50, disproving conventional common sense.

That is, as shown in FIG. 1A, after alignment treatment (rubbing treatment) is performed on the alignment layer 50 with a roller (R), a black matrix 60 is formed as shown in FIG. 1B.

Figure 8A:
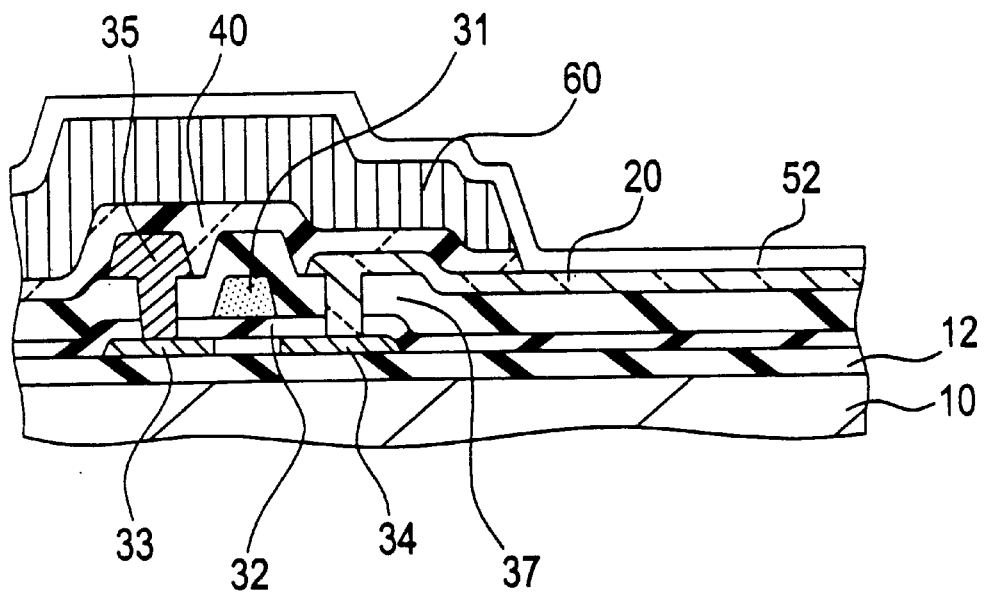
FIG. 8A is a cross-sectional view of a substrate for liquid crystal devices for comparison.
Figure 8B:
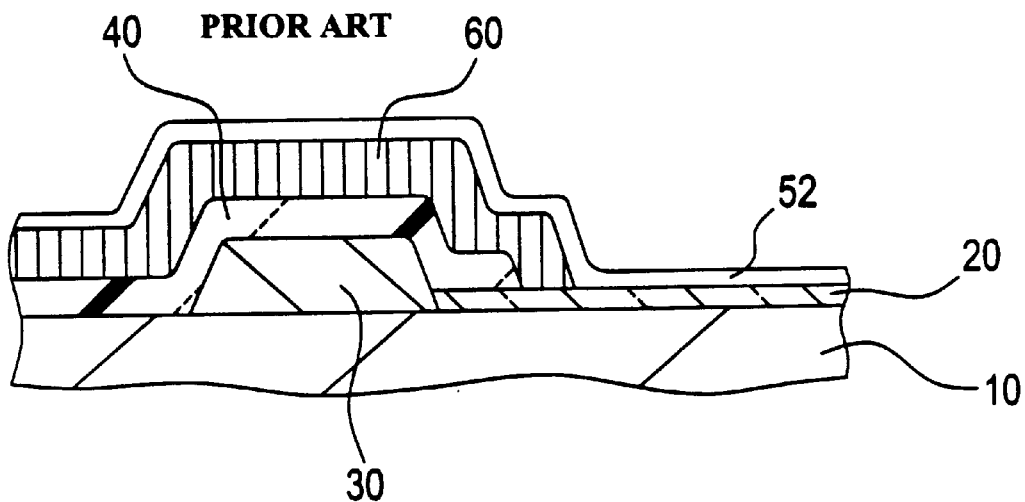
FIG. 8B is a symbolized cross-sectional view of the substrate shown in FIG. 8A.

In contrast, in accordance with conventional common sense, an alignment layer 52 is placed over a black matrix 60 as shown in FIG. 8B, since the alignment layer is formed after formation of the black matrix 60.

The present invention is characterized in that the alignment layer and the black matrix are reversed with respect to the conventional practice.

The important point here is the novel discovery by the present inventors that molecules are oriented along a specified direction in the alignment layer after alignment treatment and the molecular orientation is maintained after a resin film composing the black matrix is formed on and removed from the surface of the alignment layer. The new structure of the present invention has been conceived based on the new insight. It is preferable that an organic resinous film be used as the resinous film composing the black matrix.

The novel structure in accordance with the present invention achieves the following advantages. As shown in FIG. 1A, satisfactory alignment treatment can be performed on the alignment layer 50 with the roller (R) since the bump of the alignment layer is reduced due to absence of the black matrix, in other words, due to high flatness.

Since the alignment treatment is performed by rubbing the alignment layer on the substrate along a predetermined direction with a cloth (fabrics such as rayon and nylon), the roller (R) comes in poor contact with the alignment layer when the bump in the alignment layer is large, resulting in alignment defects. Flatness of the alignment layer is, however, secured and alignment defects barely occur in the present invention.

In contrast, as shown in FIG. 1B, since the black matrix 60 is formed on the alignment layer 50 after alignment treatment, a black matrix having a considerably high thickness can also be formed without restriction of the thickness in consideration of alignment treatment conditions. Thus, the black matrix 60 can be formed using a low-reflectance non-conductive black resinous material not containing carbon and high light blocking characteristics can be achieved by increasing the thickness.

In accordance with the structure of the present invention, if alignment defects occur in the alignment layer, they can be covered with the black matrix, and thus the image quality of a liquid crystal display barely deteriorates by means of the alignment defects.

For example, if alignment defects occur in region A represented by a semi-broken circle in FIG. 1A, the black matrix 60 covers the alignment defect region as shown in FIG. 1B, and thus the alignment defect region substantially causes no problem, resulting in improvement in the substrate for liquid crystal devices.

However, the black matrix 60 must be provided exactly on the possible region of the alignment defects in order to cover the alignment defect region of the alignment layer with the black matrix 60.

An embodiment of the preferable arrangement (layout) of the black matrix will now be described.

(Embodiment of Preferable Arrangement of Black Matrix)

Figure 4:
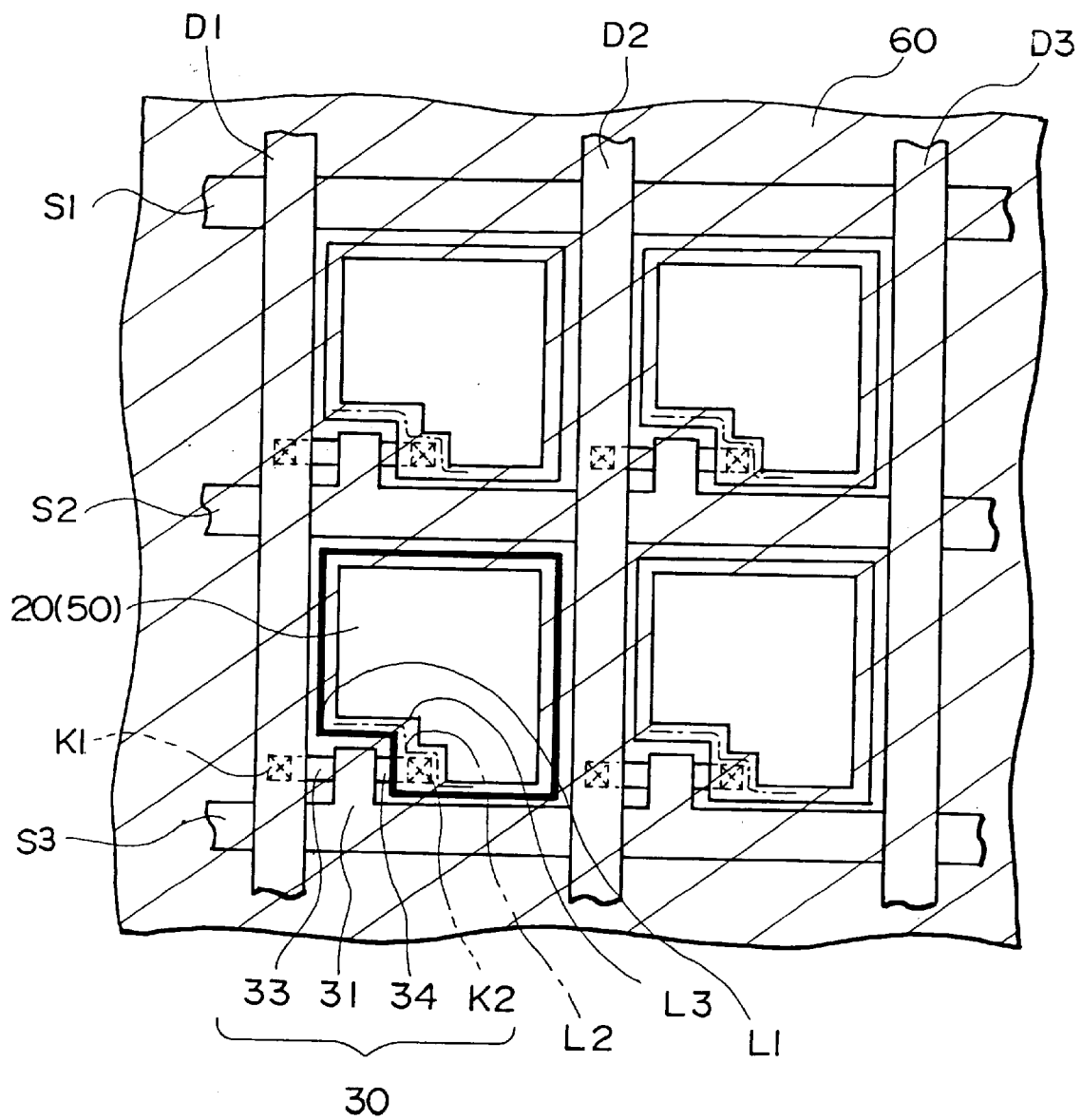
FIG. 4 is a plan view of an embodiment of a substrate (active matrix substrate) for liquid crystal devices in accordance with the present invention after forming a black matrix.

FIG. 4 is a plan view illustrating an embodiment of the preferable arrangement of the black matrix 60 at a pixel region of a TFT substrate (active matrix substrate). In FIG. 4, the black matrix 60 is represented by slanted lines.

Figure 5:
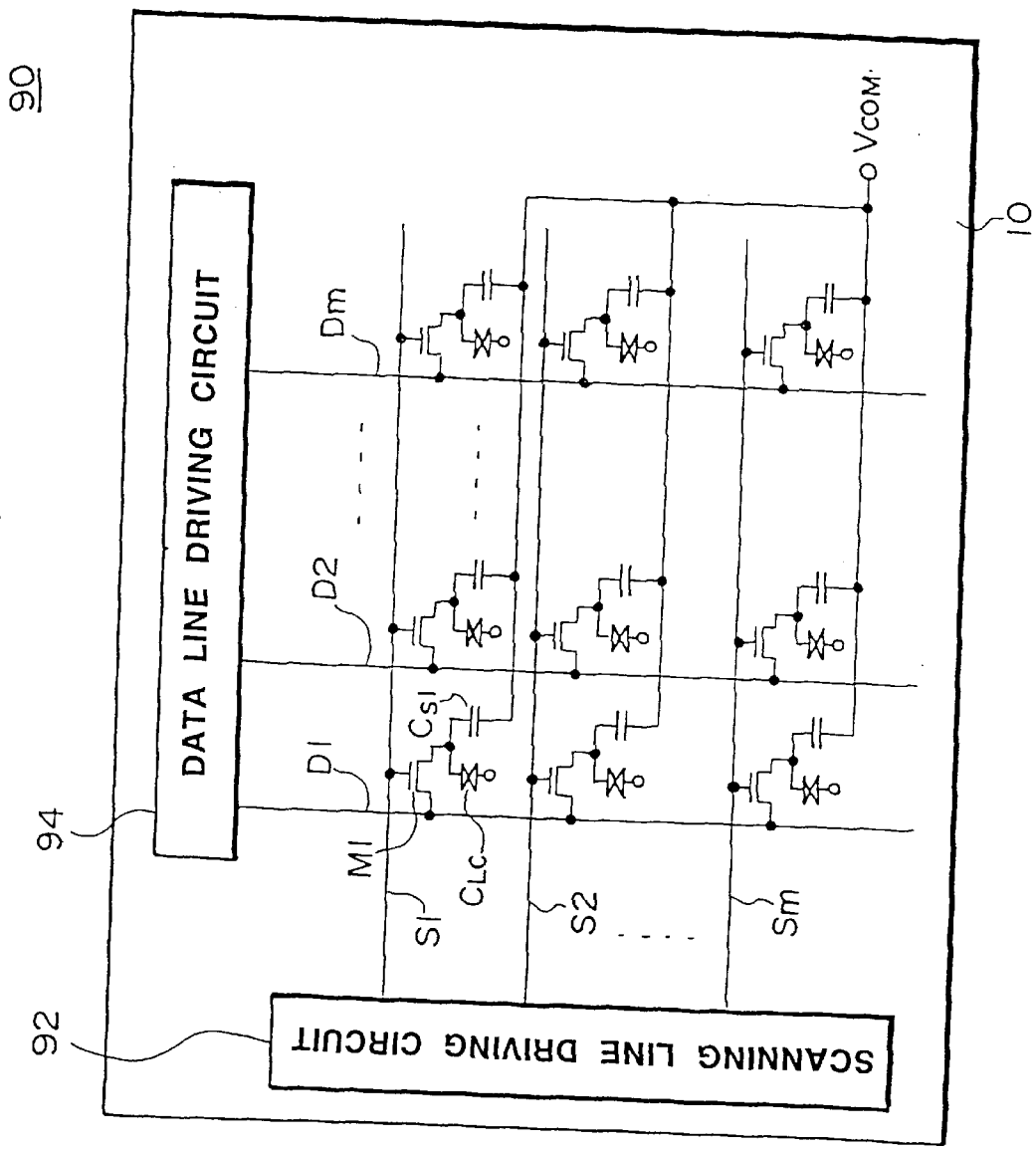
FIG. 5 is a schematic diagram for illustrating a basic configuration of an active matrix substrate.

As shown in FIG. 5, the TFT substrate 90 is provided with, on a transparent substrate 10 composed of glass or the like, a plurality of scanning lines S1 through Sm, a plurality of data lines D1 through Dm, a plurality of TFTs (M1), each TFT being connected to a scanning line and a data line, and storage capacitors $C_{S1}$ which are provided if necessary. In FIG. 5, the capacitor ($C_{LC}$) of the liquid crystal is also drawn for convenience's sake. Vcom represents common electrode voltage. Further, a scanning line driving circuit 92 and a data line driving circuit 94 are also built in the TFT substrate in FIG. 5.

In FIG. 4, the storage capacitors $C_{S1}$ shown in FIG. 5 are omitted. A pixel electrode 20 is connected to the source/drain layer 34 through a contact hole K2. A data line Dm is also connected to the source/drain layer 33 though a contact hole K1. As shown in FIG. 4, the black matrix 60 is opened on pixel electrodes 20 comprising ITO (and alignment layer 50). Noteworthy is a position of the apertures.

On the bottom left of FIG. 4, the outline L1 of a pixel electrode 20 is emphasized with bold lines. A line L2 expressed by a semi-dotted line represents a borderline of a region in which a bump may occur due to the TFT 30 (31, 33, 34) and scanning lines. The outline L3 at the aperture of the black matrix 60 is located at the interior of the outline L1 of the pixel electrode and at the interior of the borderline L2 of the region in which a bump may occur.

Therefore, the black matrix 60 extends to the interior of the pixel electrode 20 so as to prevent light leakage. Further, as shown in FIG. 1A, a bump will readily occur near the connecting section between the pixel electrode 20 and the TFT 30. Therefore, it is preferable that the bump section be covered with the black matrix 60 as shown in FIG. 1B, and thus the outline L3 of the black matrix 60 in FIG. 4 is located at the interior of the borderline L2 of the region in which the bump may occur due to TFT 30.

As described above, the black matrix 60 can be provided on all the bump sections which are present prior to formation of the black matrix 60, according to a structure of the present invention. Therefore, the defect sections of the alignment layer are covered with the black matrix 60 and the alignment defects at the bump sections do not substantially cause problems. Thus, the conditions for alignment treatment of the alignment layer also are relaxed.

(Method for Making Device Shown in FIG. 1B)

FIGS. 3A through 3E are cross-sectional views of the primary steps illustrating a method for making a device shown in FIG. 1B.

Figure 3A:
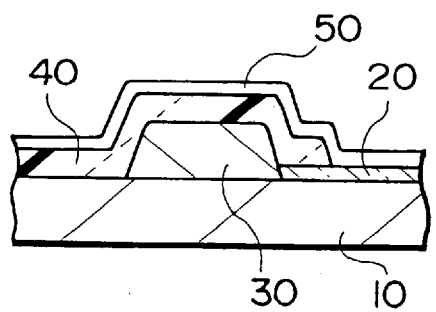
FIGS. 3A through 3E are cross-sectional views of primary steps of a method for making a substrate for liquid crystal devices in accordance with the present invention.

Step 1 (FIG. 3A)

On a substrate 10, a TFT 30, a pixel electrode 20 and a protective film 40 are formed. After the TFT substrate is washed and dried, an alignment material such as a polyimide resin is applied by spin coating or the like to form an alignment layer 50. The alignment layer 50 has a thickness of approximately 0.05 to 0.1 mm, and a resistivity of approximately $10^{15}$ to $10^{17}$ $\Omega$cm. It is preferable that the alignment layer 50 have high insulating characteristics, excellent liquid crystal alignment characteristics, high chemical resistance, and a high pretilt angle.

The TFT substrate after formation of the alignment layer 50 is allowed to stand in an oven to heat the alignment layer 50. The heating conditions depend on the alignment layer material used and generally include a temperature of about 120° C. to 250° C. and a time period of around 60 minutes.

Figure 3D:
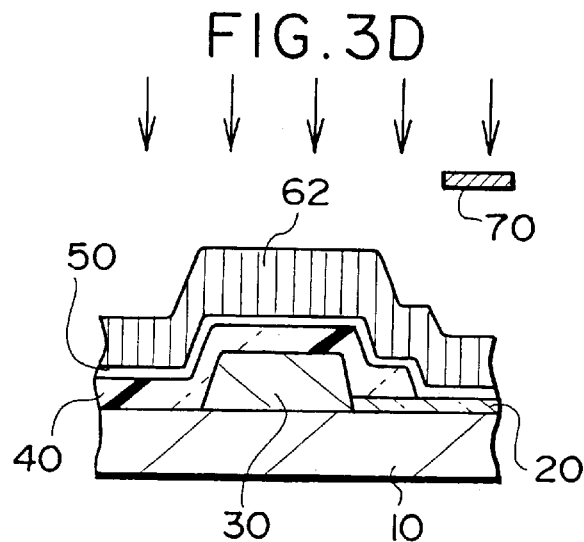
Figure 3B:
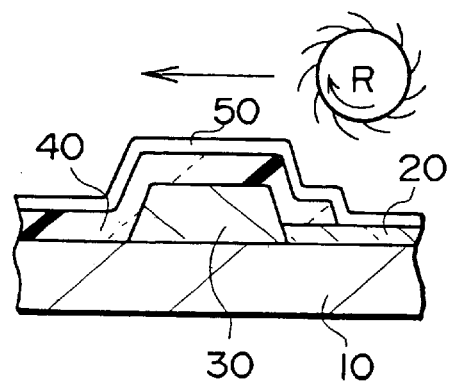

Step 2 (FIG. 3B)

Next, as shown in FIG. 3B, the alignment layer 50 is subjected to alignment treatment (rubbing treatment). A rotating roller (R), on which cloth, such as rayon or nylon fiber, is wound, rubs against the TFT substrate in a given direction under a predetermined load to orient the molecules in the alignment layer 50 in a given direction. The alignment layer 50 is, thereby, capable of aligning liquid crystal molecules.

In the alignment treatment, the bump of the alignment layer 50, caused by the thicknesses of the scanning line and data line, is approximately 0.5 mm to 1 mm. This bump is considerably smaller than that in conventional alignment treatment of an alignment layer on a black matrix, i.e., 1.5 mm to 2.5 mm. Thus, rubbing treatment can be easily performed and alignment defects are decreased.

Figure 3E:
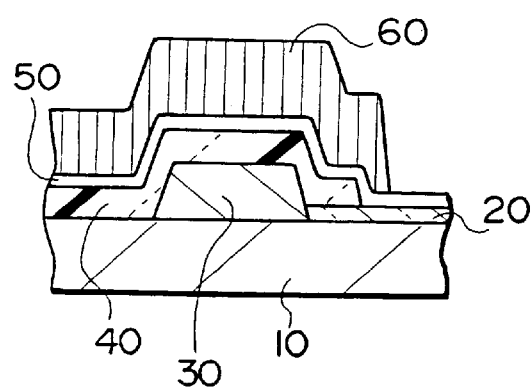
Figure 3C:
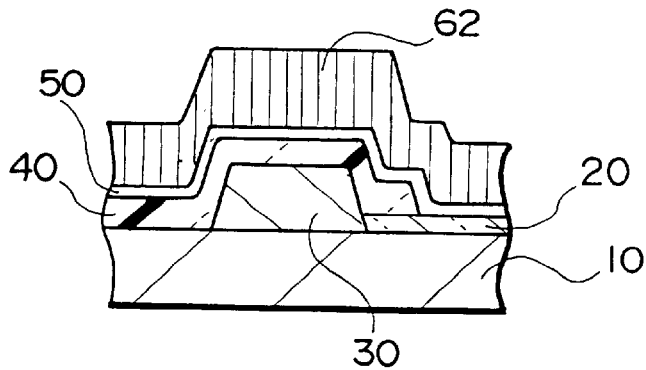

Step 3 (FIG. 3C)

Then, a black resinous material 62 as a black matrix component is applied to the entire TFT substrate. It is preferable in view of fewer steps that a black photosensitive resin (black resist) be used as the black resinous material 62. The following are detailed descriptions.

The TFT substrate is dried in an oven to remove water which causes a decrease in adhesiveness of the black resist. Drying is performed in a nitrogen atmosphere at a temperature of about 120° C. to 200° C. for about 10 minutes to 30 minutes.

In order to further improve the adhesiveness of the black resist which acts as a light blocking film, an adhesion improver such as hexamethyldisilazane (HMDS) is applied by a spin coating process or a vapor process in which the substrate is allowed to stand in the vapor of the adhesion improver at room temperature for about 1 to 5 minutes.

The black resist 62 is applied to the entire TFT substrate by a spin coat process or a roller coating process.

The substrate is subjected to pre-baking to remove the solvent in the black resist. The pre-baking conditions depend on the black resist used, and generally include a temperature between about 80° C. and 90° C. and a time period between about 20 minutes and 60 minutes when using an oven. The pre-baking may be performed with a hot plate. In this case, the temperature may be the same as that in the oven, and the time period ranges from 3 minutes to 5 minutes.

FIG. 3C shows a state in which the above-mentioned treatment is completed.

Step 4 (FIG. 3D)

The black resist film formed on the entire substrate surface is processed into a given pattern. The TFT substrate is introduced into a pattern exposure system, and exposed by radiating light over the black resist through a photo mask 70 having a given exposure pattern as shown in FIG. 3D. The exposure energy ranges from approximately 100 to 400 mJ/cm². When the black resist is a negative type, the light irradiated portion remains as shown in FIG. 3E. When the black resist is a positive type, the light nonirradiated portion remains.

Step 5 (FIG. 3E)

The exposed substrate is immersed into a given developer to develop. After development, the substrate is washed to remove the black resist residue by pressurized water spray washing and/or running water washing for about 5 to 15 minutes. Next, the substrate is subjected to post-baking to completely cure the black resist. The conditions of post-baking depend on the black resist used, and generally include a temperature between about 200° C. and 250° C. and a time period of about 60 minutes to 120 minutes.

As a result of these steps, a black matrix 60 having a given pattern is formed on the substrate as shown in FIG. 3E.

Although the black matrix 60 is formed using a photosensitive black resinous material in the above-mentioned production process, non-photosensitive black resinous materials, such as a carbon-dispersed non-photosensitive polyimide resin, can also be used without restriction to the above description. In this case, a black matrix is obtained as follows.

After a non-photosensitive black resin is applied to the substrate after alignment treatment, the substrate is heated to approximately 80° C. to 90° C. to precure the resin film, a negative or positive type photoresist is applied by a conventional process, the photoresist is exposed using a photo mask having a given pattern, and photoresist development and resin etching are simultaneously performed using a given developer.

The photoresist is removed by a predetermined method, and the substrate is subjected to high temperature curing at approximately 120° C. to 250° C. to form a black matrix pattern.

(2) Second Embodiment

In this embodiment, an active matrix substrate using metal insulator metal (MIM) as a switching element is used instead of the TFT substrate in the first embodiment.

Figure 6A:
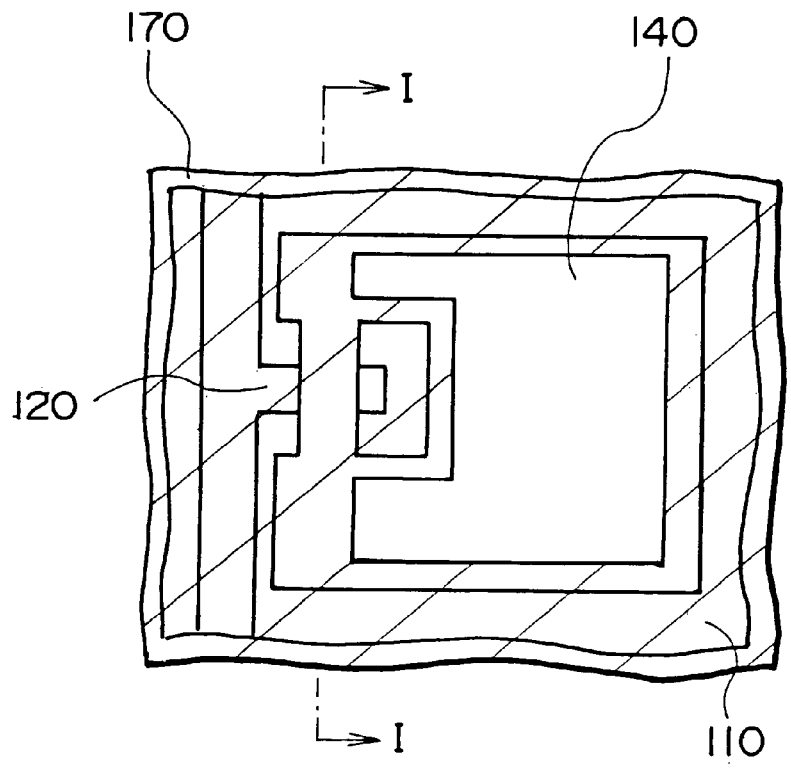
FIG. 6A is a plan view of a main section of another embodiment of a substrate (active matrix substrate) for liquid crystal devices in accordance with the present invention after forming a black matrix.
Figure 6B:
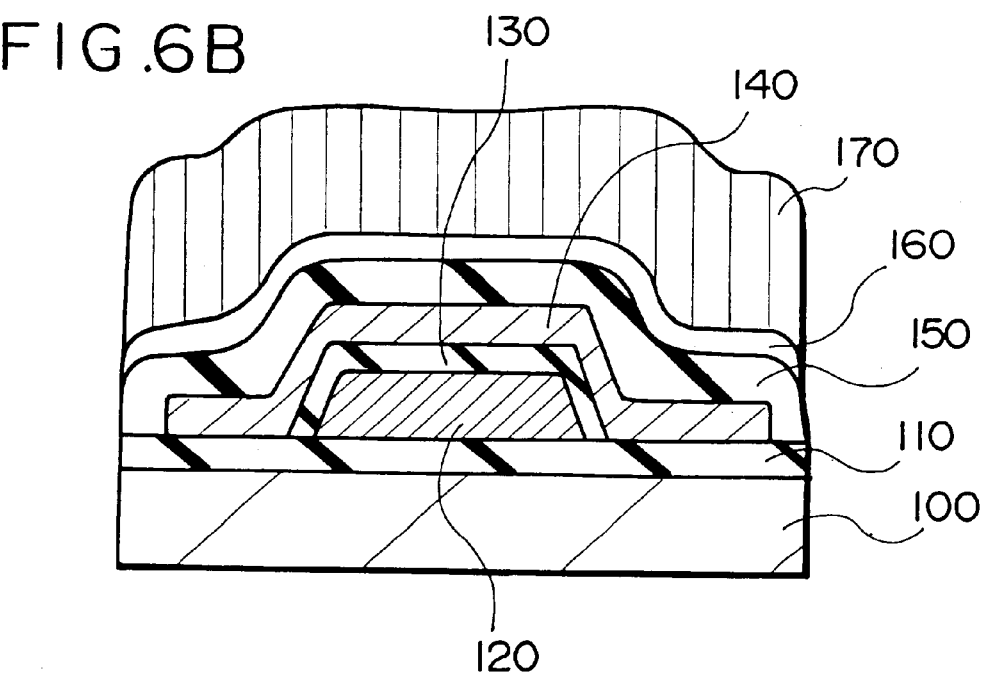
FIG. 6B is a cross-sectional view along line I—I of the substrate shown in FIG. 6A.

FIG. 6A is a plan view of a pixel section of an active matrix substrate using a MIM element, and FIG. 6B is a cross-sectional view along line I—I in FIG. 6A.

As shown in FIG. 6B, a tantalum film 110 is formed on a transparent substrate 100 composed of glass or the like, and an alloy film 120 composed of tantalum and tungsten is formed thereon. An insulating film 130 is formed thereon by anodic oxidation, and an ITO film (pixel electrode) 140 is formed thereon. An alignment film 160 is formed on the insulating film 150, and a black matrix 170 is formed thereon.

As shown in FIG. 6A, the black matrix 170 is opened on the pixel electrode 140 composed of ITO as in FIG. 4. The outline of the aperture is located at the interior of the outline of the pixel electrode. Achieved advantages are the same as those in the first embodiment.

(3) Third Embodiment

In the first embodiment, the alignment layer 50 is formed on the insulating film 40 as shown in FIG. 1B. On the other hand, in this embodiment, an alignment film 52 acts as an insulating film as shown in FIG. 7B, and thus the insulating film 40 as in FIG. 1B is omitted. Therefore, production cost can be reduced by reduced production steps, and flatness of the alignment layer is further improved, resulting in decreased alignment defects.

Figure 7A:
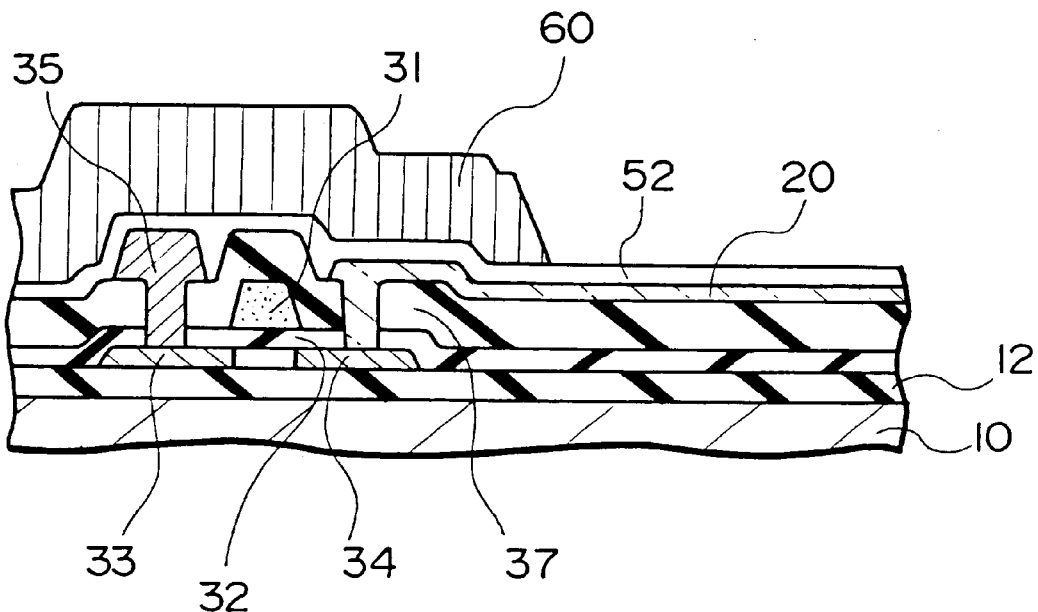
FIG. 7A is a cross-sectional view of a main section of another embodiment of a substrate for liquid crystal devices in accordance with the present invention.
Figure 7B:
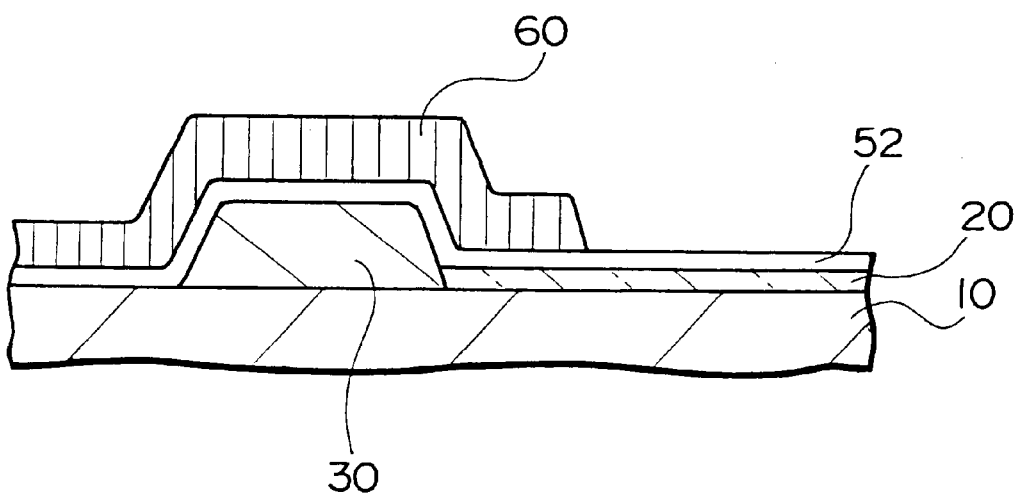
FIG. 7B is a symbolized cross-sectional view of the substrate shown in FIG. 7A.

The structure is shown in FIG. 7A. A TFT shown in FIG. 7A is a planer polysilicon TFT, in which an aluminum electrode 35 and an ITO film (pixel electrode) 20 belong to the same level. Such a configuration has a small bump on the device surface compared to the configuration shown in FIG. 2A and an advantage, i.e., flatness of the alignment layer 52.

In this embodiment, a polyimide resin is used as a material for the alignment layer 52. The polyimide resin has excellent insulation characteristics and is used as an inter-level insulating film in ICs. Thus, the polyimide resin alignment layer 52 effectively acts as an insulating film. As a result, if insulating characteristics of the black resinous material composing the black matrix 60 slightly deteriorate, problems such as short-circuiting between the aluminum electrode and the ITO film 20 will not occur.

FIGS. 8A and 8B show a conventional device structure (structure of a comparative example). As shown in FIG. 8A, since an alignment layer 52 is formed on a black matrix 60 in the conventional structure, the black matrix 60, an inter-level insulating film 40 and a TFT are present under the alignment layer 52, and thus the alignment layer 52 has a large bump.

In contrast, as shown in FIGS. 7A and 7B, only the TFT is present under the alignment layer 52 according to the structure of this embodiment, and the bump of the alignment layer 52 is low. Thus, alignment treatment is readily performed on the alignment layer 52.

An embodiment of a method for making the device shown in FIG. 7A will now be described.

First, a TFT is formed on a substrate 10 by using, for example, a low temperature polysilicon process. After washing and drying, an alignment material is applied to the TFT substrate. Examples of usable alignment materials include a polyimide alignment material which is a mixture of A13046 made by Japan Synthetic Rubber Co., Ltd., g-butyrolactone and butyl cellosolve. This alignment material is applied by a spin coating process. The film thickness ranges from approximately 200 Å to 2,000 Å, and is typically 1,000 Å.

The alignment layer is baked in a nitrogen atmospheric oven at about 180° C. for about 60 minutes.

Next, after alignment treatment by a rubbing process, a black resinous material is applied. A usable black resinous material is photosensitive black-pigment-dispersed negative resist BK-550S made by Tokyo Ohka Kogyo Co., Ltd.

Prior to black resist coating, an adhesive improver is applied by a spin coating process, and a black resist is applied at a thickness (0.5 mm to 3 mm) of which irregular coating does not occur, typically 1.9 mm, followed by pre-baking with a hot plate in a nitrogen atmosphere at about 90° C. for about 5 minutes.

The TFT substrate provided with the black resist is introduced into a pattern exposure system, and exposed through a given photo mask. The exposure energy is approximately 400 mJ/cm².

The exposed TFT substrate is developed with a given developer, thoroughly washed by high pressure water spraying, and washed with running water.

The TFT substrate provided with the black matrix is allowed to stand in a nitrogen atmospheric oven at about 230° C. for 60 minutes for post-baking. After the post-baking, the thickness of the black resist decreases from the applied thickness, for example, an applied thickness of 1.9 mm decreases to approximately 1.5 mm. The optical density of the light blocking film due to the black resist is approximately 2.5.

Three embodiments, in which the present invention is applied to an active matrix substrate, were described above. The present invention is also applicable to any substrates having black matrices other than the active matrix substrate, regardless of type. For example, the present invention is applicable to a case in which a black matrix is formed on the opposite substrate side.

(4) Fourth Embodiment

Figure 9:
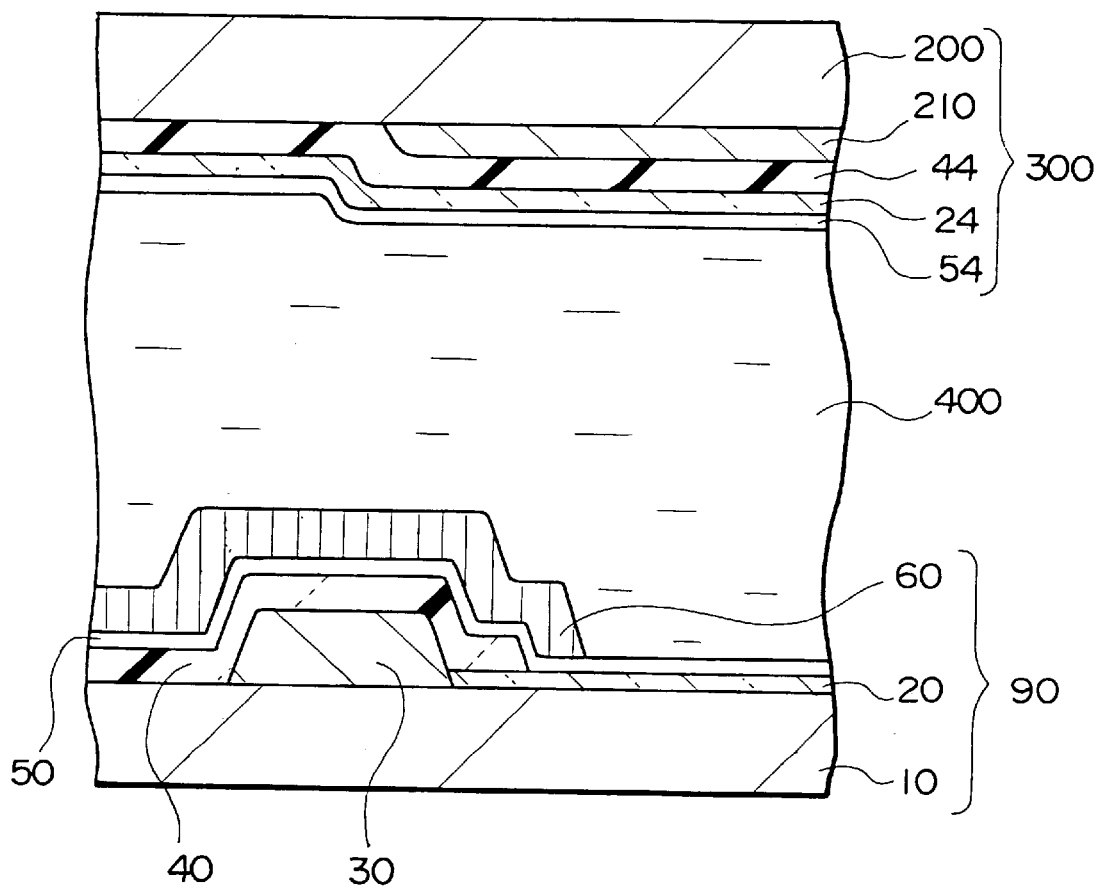
FIG. 9 is a cross-sectional view of a main section of an embodiment of a liquid crystal display panel formed using a substrate for liquid crystal devices in accordance with the present invention.

FIG. 9 is a cross-sectional view of a main section of a liquid crystal display panel using an active matrix substrate 90 described in the above-mentioned embodiment.

A color filter substrate (opposite substrate) 300 is provided opposite the active matrix substrate 90, and liquid crystal 400 is interposed between both substrates (90, 300).

The opposite substrate 300 is provided with a transparent substrate 200 composed of glass or the like, a color filter 210, an insulating film 44, an ITO film 24 and an alignment layer 54.

The liquid crystal display panel in FIG. 9 is produced as follows. A thermosetting sealing material (not shown in the drawing) is printed so as to form a frame around a TFT substrate 90 by a screen printing process or the like, a gaping agent (not shown in the drawing) is sprayed, the TFT substrate 90 and the opposite substrate 300 are laid, and the sealing material is cured in an oven under a given pressure. Liquid crystal is injected into a space between the jointed substrates by vacuum injection and the injection port is sealed with a sealant.

Since the black matrix 60 is provided on the alignment layer 50 so as to cover the bump section in the active matrix substrate 90 as described above, no alignment defect exists in the alignment layer, and thus the liquid crystal display panel shown in FIG. 9 is a highly reliable apparatus capable of displaying high quality images.

Figure 10:
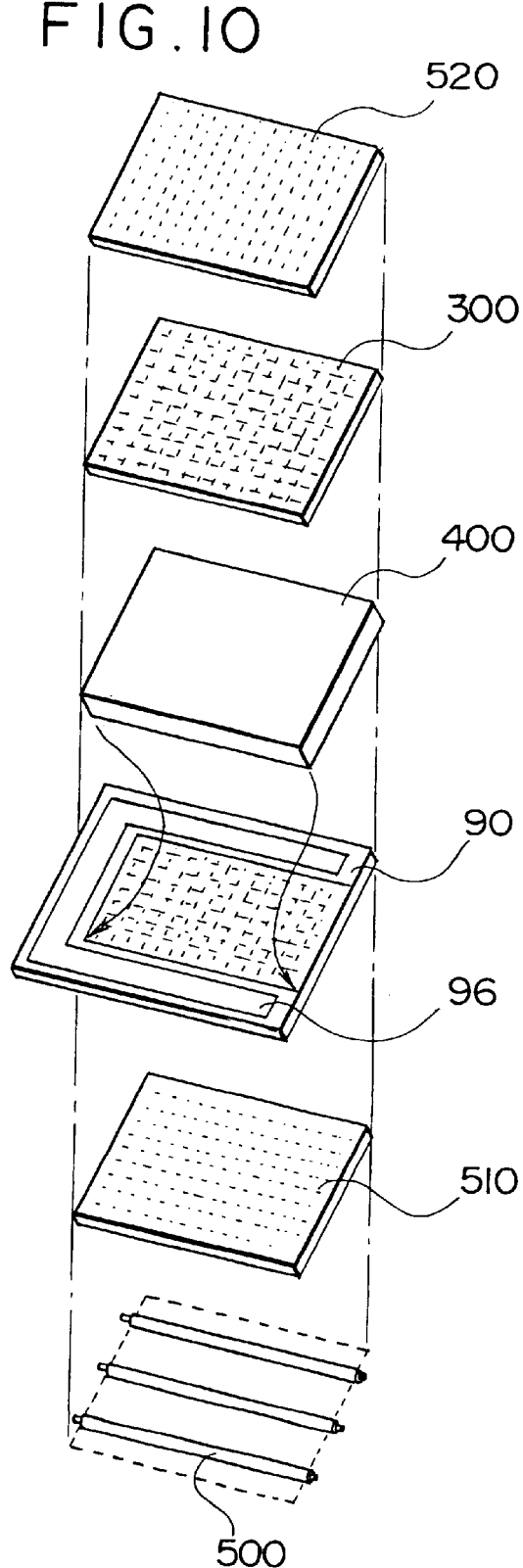
FIG. 10 is a view for illustrating a basic configuration of a liquid crystal display panel.

FIG. 10 shows an embodiment of the entire configuration of a transparent type liquid crystal display panel. The liquid crystal display panel is provided with an active matrix substrate 90 having a back light 500, a polarizer 510 and a driving circuit 96; a liquid crystal 400; an opposite substrate 300 and a polarizer 520.

(5) Fifth Embodiment

Figure 11:
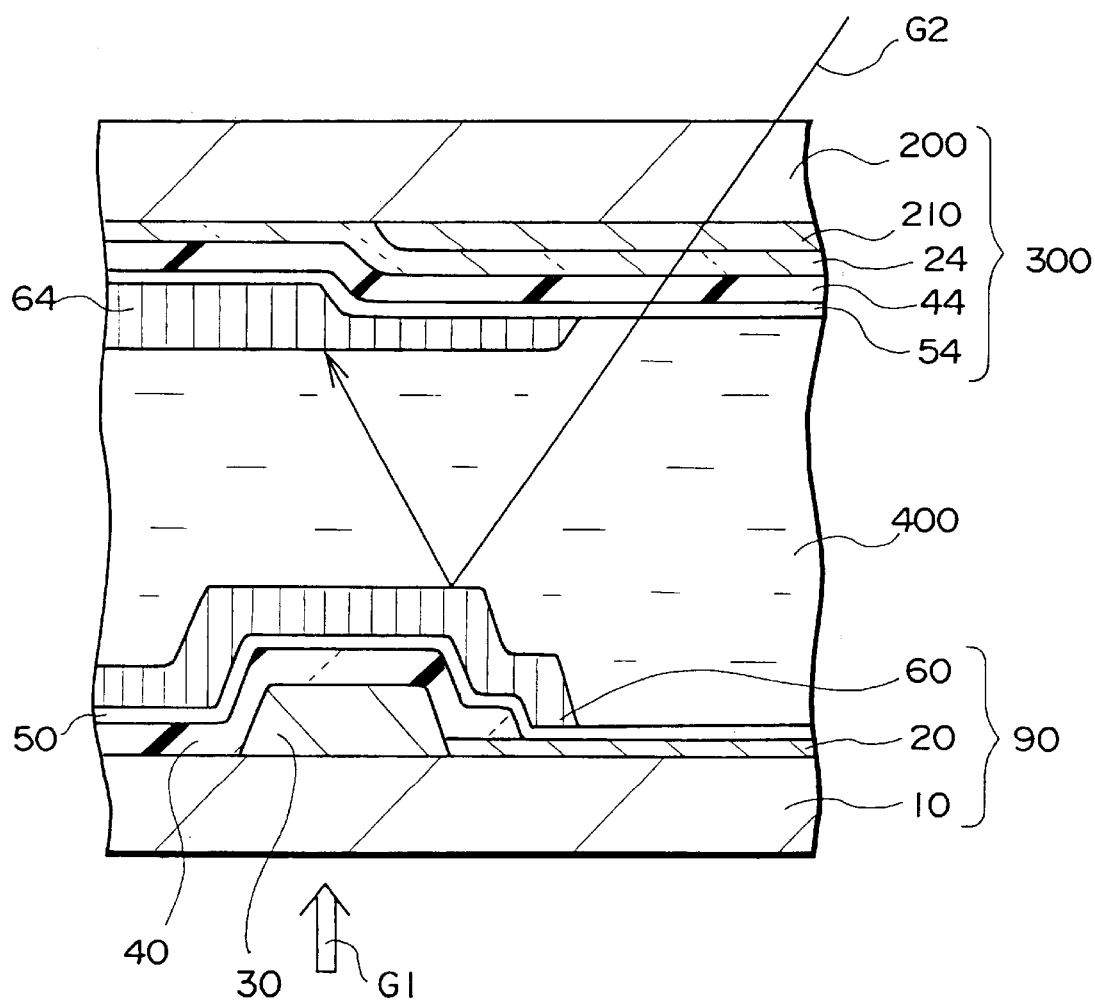
FIG. 11 is a cross-sectional view of a main section of another embodiment of a liquid crystal display panel formed using a substrate for liquid crystal devices in accordance with the present invention.

In a liquid crystal display device shown in FIG. 11, the present invention is applied to a color filter substrate (opposite substrate) 310, and a black matrix 64 is formed on the upper layer.

The color filter substrate (opposite substrate) 310 comprises a color filter 210, an ITO film 24, an interlevel insulating film 44, an alignment layer 54 and a black matrix 64. Alignment treatment of the alignment film 54 is readily achieved since the black matrix 64 is provided on the alignment film 54.

In this embodiment, since a black matrix is also formed on the color filter substrate (opposite substrate), as well as on the active matrix substrate, leakage of light reflected off the black matrix can be effectively prevented.

For example, as shown in FIG. 11, when external light (light entering from the outside) G2 is reflected on the black matrix 60 of the active matrix substrate, the reflected light is trapped by the black matrix 64 of the color filter and is not leaked outside. Thus, deterioration of the display quality can be prevented.

As described above, the present invention is applicable to various usages.

(6) Sixth Embodiment

In this embodiment, a liquid crystal panel produced by using an active matrix substrate in accordance with the present invention, and an electronic device using such a panel will be described. These are high quality devices free of display quality deterioration due to alignment defects.

Figure 12:
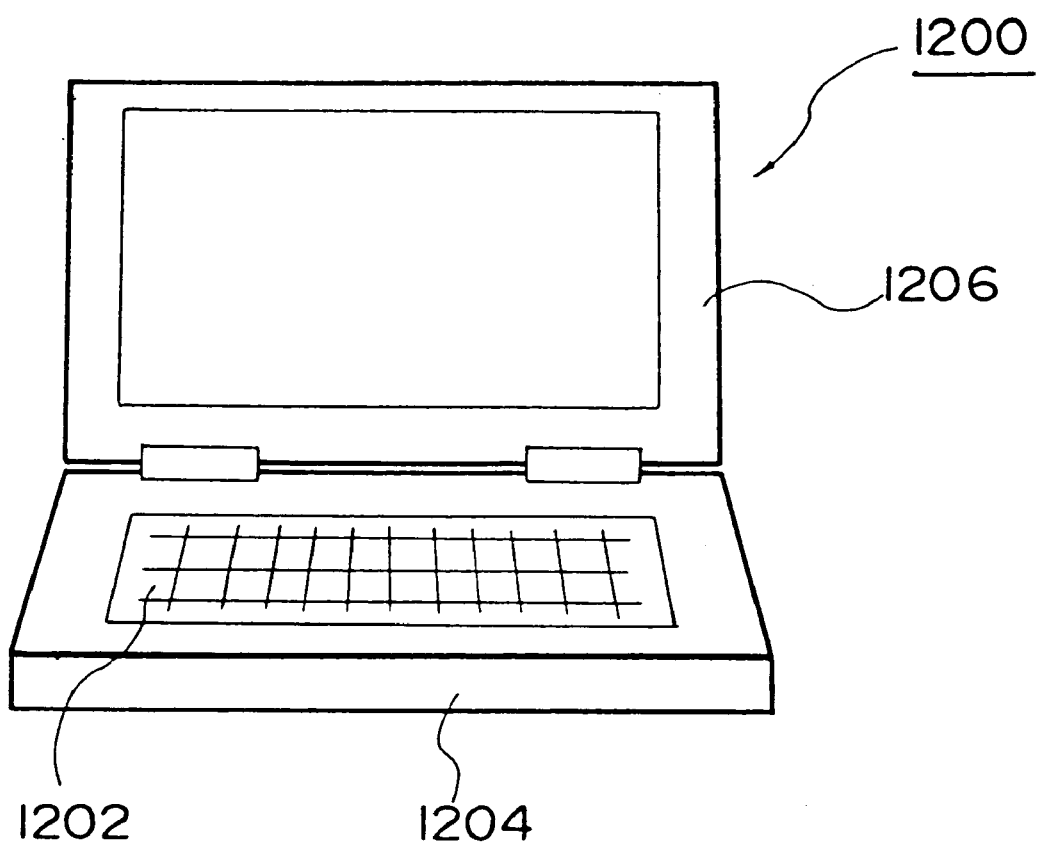
FIG. 12 is a view illustrating an embodiment of an electronic device (personal computer) using a liquid crystal device in accordance with the present invention.

(1) Personal Computer (FIG. 12)

A personal computer 1200 shown in FIG. 12 is provided with a main body 1204 having a key board 1202, and a liquid crystal display 1206.

Figure 13:
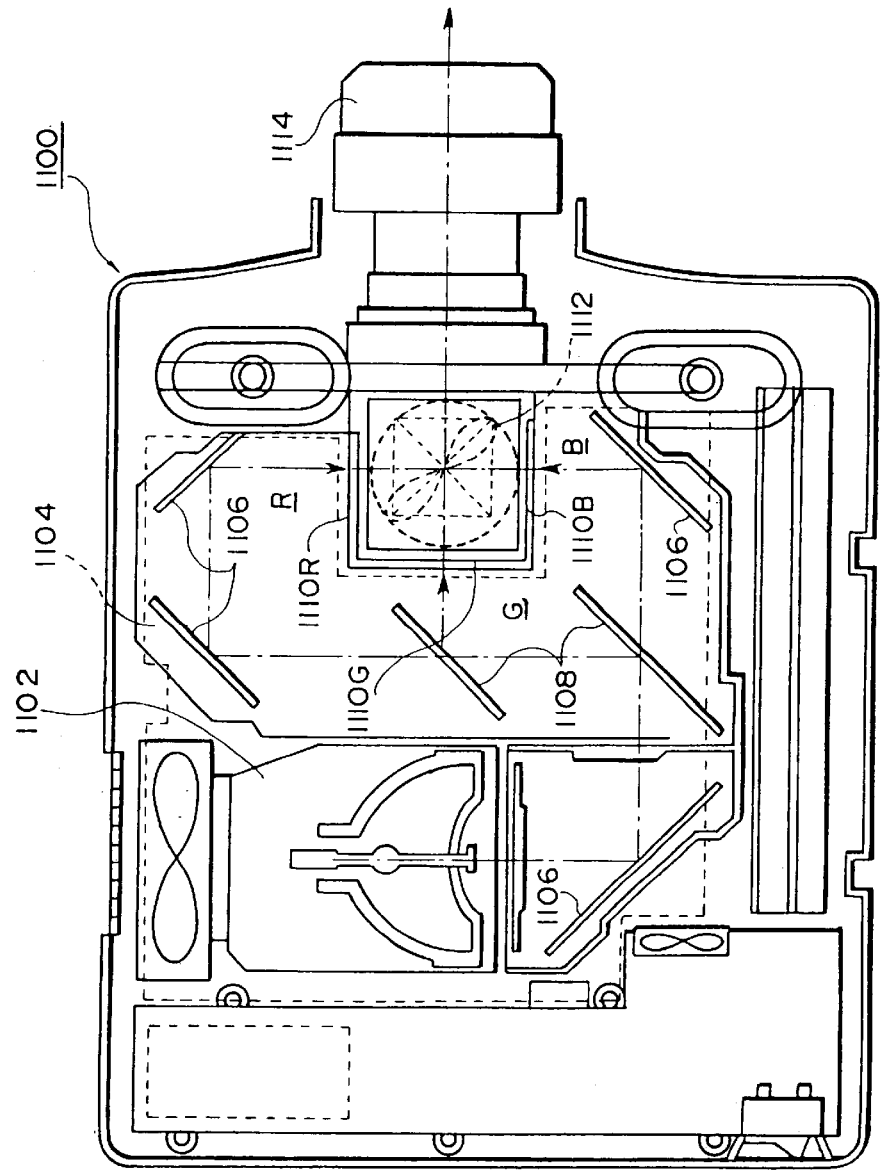
FIG. 13 is a view illustrating another embodiment of an electronic device (liquid crystal projector) using a liquid crystal device in accordance with the present invention.

(2) Liquid Crystal Projector (FIG. 13)

A liquid crystal projector 1100 shown in FIG. 13 is a projection type projector using a transparent liquid crystal panel as a light valve, and uses, for example, a triple plate prism type optical system.

In FIG. 13, projection light emitted from a lamp unit 1102 as a white light source is divided into R, G and B primaries through a plurality of mirrors 1106 and two dichroic mirrors 1108 in the interior of a light guide 1104 in the projector 1100 to lead to three liquid crystal panels 1110R, 1110G and 1110B for displaying images of their respective colors. Light modulated by each liquid crystal panel 1110R, 1110G or 1110B is incident on a dichroic prism 1112 along one of the three directions. In the dichroic prism 1112, red R and blue B light beams are bent by 90 degrees, a green G light beam passes straight through to synthesize an image composed of these colors, and a color image is projected on a screen or the like through a projection lens 1114.

Examples of other electronic devices in which the present invention is applicable include engineering work stations (EWS), pagers or portable phones, word processors, televisions, view finder type and monitoring type video tape-recorders, electronic notebooks, electronic portable calculators, vehicle navigation systems, POS terminals, and equipment provided with a touch panel.

What is claimed is:

1. A substrate for liquid crystal devices comprising:
   a scanning line, a data line and a switch element connected to said scanning line and said data line, provided on the substrate;
   a pixel electrode connected to said switch element;
   an insulating film formed so as to cover said switch element;
   an alignment layer provided on said insulating film and said pixel electrode, wherein said alignment layer has been subjected to alignment treatment; and
   a light blocking layer provided on said alignment layer so as to cover a part of said alignment layer, wherein said light blocking layer is opened on said pixel electrode, and an outline of an aperture section of said light blocking layer is located at an interior of the outline of said pixel electrode, wherein the outline of the aperture section of said light blocking layer is located at the interior of a bump section formed near a joint section of said pixel electrode and said switch element.

2. A substrate for liquid crystal devices according to claim 1, wherein said light blocking layer comprises a black resinous material.

3. A substrate for liquid crystal devices according to claim 1, wherein said light blocking layer comprises a black photosensitive resinous material.

4. A substrate for liquid crystal devices comprising:
   a scanning line, a data line and a switch element connected to said scanning line and said data line, provided on the substrate;
   a pixel electrode connected to said switch element;
   an insulating alignment layer formed so as to cover said switch element and said pixel electrode, wherein said insulating alignment layer has been subjected to alignment treatment; and
   a light blocking layer provided on said alignment layer so as to cover a part of said alignment layer, wherein said light blocking layer is opened on said pixel electrode, and an outline of an aperture section of said light blocking layer is located at an interior of the outline of said pixel electrode, wherein the outline of the aperture section of said light blocking layer is located at the interior of a bump section formed near the joint section of said pixel electrode and said switch element.

5. A substrate for liquid crystal devices according to claim 4, wherein said switch element is an insulator gate type thin film transistor, a source region and a drain region of the thin film transistor are connected to a first electrode comprising a conductive material composing said data line and a second electrode comprising a material composing said pixel electrode, and the first and second electrodes belong to a same level.

6. A substrate for liquid crystal devices according to claim 4, wherein said light blocking layer comprises a black resinous material.

7. A substrate for liquid crystal devices according to claim 4, wherein said light blocking layer comprises a black photosensitive resinous material.

8. A method for making liquid crystal devices comprising:
   a first step for forming an alignment layer on a substrate;
   a second step for performing alignment treatment to said alignment layer after the first step; and
   a third step for forming a light blocking layer on said alignment layer after the second step.

9. A method for making liquid crystal devices comprising:
   a first step for forming an alignment layer on a substrate;
   a second step for performing alignment treatment on said alignment layer;
   a third step for forming a photosensitive resinous film on the alignment layer after the second step; and
   a fourth step for exposing and developing said photosensitive resinous film to form a light blocking layer.

10. A liquid crystal device comprising a pair of substrates provided with electrodes and alignment layers, said pair of substrates being arranged such that said alignment layers are facing each other, a liquid crystal material being interposed between said pair of substrates;
    light blocking layers being formed on both substrates of said pair of substrates, and said light blocking layers being provided on said alignment layers of said both substrates.

11. An electronic device comprising a liquid crystal device described in claim 10.

* * * * *